United States Patent [19]

Horn

[11] 4,225,057
[45] Sep. 30, 1980

[54] SYSTEM FOR MONITORING UNIT AND TOTAL QUANTITIES OF A DISPENSER FLUID

[75] Inventor: Jerry Horn, Maitland, Fla.

[73] Assignee: Zyvex International, Maitland, Fla.

[21] Appl. No.: 867,799

[22] Filed: Jan. 9, 1978

[51] Int. Cl.³ .............................................. B67D 5/12
[52] U.S. Cl. ...................................... 222/27; 222/34; 222/36
[58] Field of Search .................. 222/23, 32, 34, 36, 222/25–28, 30, 37, 38; 235/94 R, 92 FL, 144 D; 364/465; 200/44

[56] References Cited

U.S. PATENT DOCUMENTS

| | | | |
|---|---|---|---|
| 2,176,794 | 10/1939 | Greene et al. | 222/25 X |
| 3,257,033 | 6/1966 | Stott | 222/36 |
| 3,467,279 | 9/1969 | Upton et al. | 235/92 FL |
| 3,497,644 | 2/1970 | Schink et al. | 200/44 X |
| 3,665,167 | 5/1972 | Goodwin | 222/23 X |
| 3,699,315 | 10/1972 | Upton | 222/23 X |
| 3,949,207 | 4/1976 | Savary et al. | 364/465 X |
| 3,965,337 | 6/1976 | Young | 222/26 X |

Primary Examiner—Robert J. Spar
Assistant Examiner—Edward M. Wacyra
Attorney, Agent, or Firm—Duckworth, Hobby, Allen & Pettis

[57] ABSTRACT

A flow meter for use in monitoring unit and total quantities of a dispensed fluid, such as draft beer, includes a motion detection switch inside a housing and is coupled to a valve which controls the fluid flow. The switch provides an electrical indication during periods when the valve is open. A totalizer including microprocessor circuitry totalizes the amount of fluid passing through the valve based upon an adjustable, predetermined flow rate setting. An indicator is also coupled to the totalizing circuitry to provide an indication when a unit quantity has passed through the valve at the predetermined flow rate. The totalizer further totalizes the number of occurrences of the unit quantity or any other preselected quantity.

29 Claims, 5 Drawing Figures

SYSTEM FOR MONITORING UNIT AND TOTAL QUANTITIES OF A DISPENSER FLUID

BACKGROUND OF THE INVENTION

1. Field of the Invention

The present invention relates to systems which are designed to account for fluids being dispensed from a fluid container, and in particular is designed to monitor the amounts of beverages, such as draft beer, which are dispensed in varying quantities.

2. Description of the Prior Art

Numerous systems have been developed in the past for measuring and totalizing the amount of a fluid dispensed from a container of the fluid. Typically, such arrangements employ a mechanical element, such as a rotor, in the fluid flow path in order to measure the amount of fluid dispensed based upon the actual flow rate out of the container. Conventional gasoline pumps are an example of these types of prior art systems. Another example is disclosed in U.S. Pat. No. 3,780,579 to Barnard.

Such arrangements have not proven satisfactory in dispensing beverages because of the bulkiness of the required structures and the inherent cost. Accordingly, electronic systems have been developed for the purpose of monitoring the dispensing of beverages.

In U.S. Pat. No. 3,965,337, Young discloses a draft beer monitoring system in which the amount of beer dispensed is displayed as a function of dollars and cents. As disclosed by the patentee, the monitor may be switched between glass and pitcher rate monitors.

In U.S. Pat. No. 3,665,167, Goodwin discloses a system similar to that disclosed in the aforementioned patent to Young, in that the output is measured in monetary quantities.

In U.S. Pat. No. 3,699,315, Upton discloses a monitor for fluid dispensers in which accountability is dependent upon the amount of price per unit volume.

The manner in which draft beer is customarily sold creates particularly unique problems for the monitoring and control of draft beer sales. For example, draft beer is usually sold in a standard quantity, such as an eight ounce glass. Frequently, however, a larger quantity of beer, such as a pitcher, is sold at a discount per ounce with respect to the per ounce price of beer by the glass.

Additionally, it is frequently necessary for cleaning personnel to dismantle the beer dispensing equipment for maintenance and cleaning purposes. Therefore, the accountability system must be able to maintain the count through such activity and distinguish between an authorized dismantling for cleaning purposes and an unauthorized tampering or intrusion of the accountability system.

It is also preferable that draft beer accountability systems be compact, since the space in areas where draft beer is dispensed is usually limited. It is especially important that the system be free of any connections to alternating current line voltage, because of the shock hazard potential. Further, while experienced personnel are familiar with the appropriate point to shut the tap off to fill a bear glass or pitcher, inexperienced operators frequently fill the glass unevenly, causing spillage.

SUMMARY OF THE INVENTION

The present invention contemplates apparatus for measuring and totalizing an amount of a fluid dispensed through an outlet from a reservoir of the fluid, in which the outlet is of the type controlling the flow of the fluid from the reservoir by movement between open and closed positions. The apparatus includes position detecting means coupled at the outlet for detecting the movement between the open and closed positions and providing an electrical output responsive to that movement. A totalizer is included with the apparatus for receiving the output from the position detecting means and totalizing an amount of the fluid passing through the outlet based on a setting in the totalizer for a predetermined flow rate. Means are coupled externally of the totalizer for changing the setting therein to another predetermined flow rate.

In accordance with the present invention, the apparatus is provided with two basic subsystems which may be utilized independent of each other. One of the subsystems includes an indicator, such as a light coupled to the totalizer, the totalizer including first means for energizing the indicator for each occurrence of the flow of a preselected amount of the fluid passing through the outlet at a predetermined flow rate.

The second subsystem includes a count display, the totalizer further including second means for consecutively counting each occurrence of a specified amount of the fluid passing through the outlet at a predetermined flow rate during any uninterrupted opening of the outlet, and storing a total of all of the occurrences. Means are also included for coupling the count display to the totalizer such that a count representative of all of the occurrences can be displayed.

As noted previously, the present invention has a specific application in the monitoring of draft beer. For this application, there is provided a housing adapted to be mounted on the tap of a draft beer dispenser, the housing including the position detecting means and a portion of the totalizer circuitry. That portion of the apparatus within the housing is further provided with tamper detection means for detecting unauthorized entry into the housing, or alternatively, unauthorized tampering with the housing. A manager's control unit is also provided, this control unit also including a portion of the totalizing circuitry and means for selecting between the two subsystems; and further includes means for calibrating the totalizer to establish the predetermined flow rate, the preselected amount of beer for operation of the first subsystem, and the specified amount for operation of the second subsystem.

In the preferred embodiment of the present invention, the totalizing means comprises a programmed microprocessor unit (MPU) in the control unit, with associated circuitry. The tap unit housing has an unprogrammed MPU therein which is controlled by a random access memory (RAM). The specific functions are loaded in RAM by interconnection with the MPU in the control unit.

DETAILED DESCRIPTION

A. The Tap Unit

Figure 1:
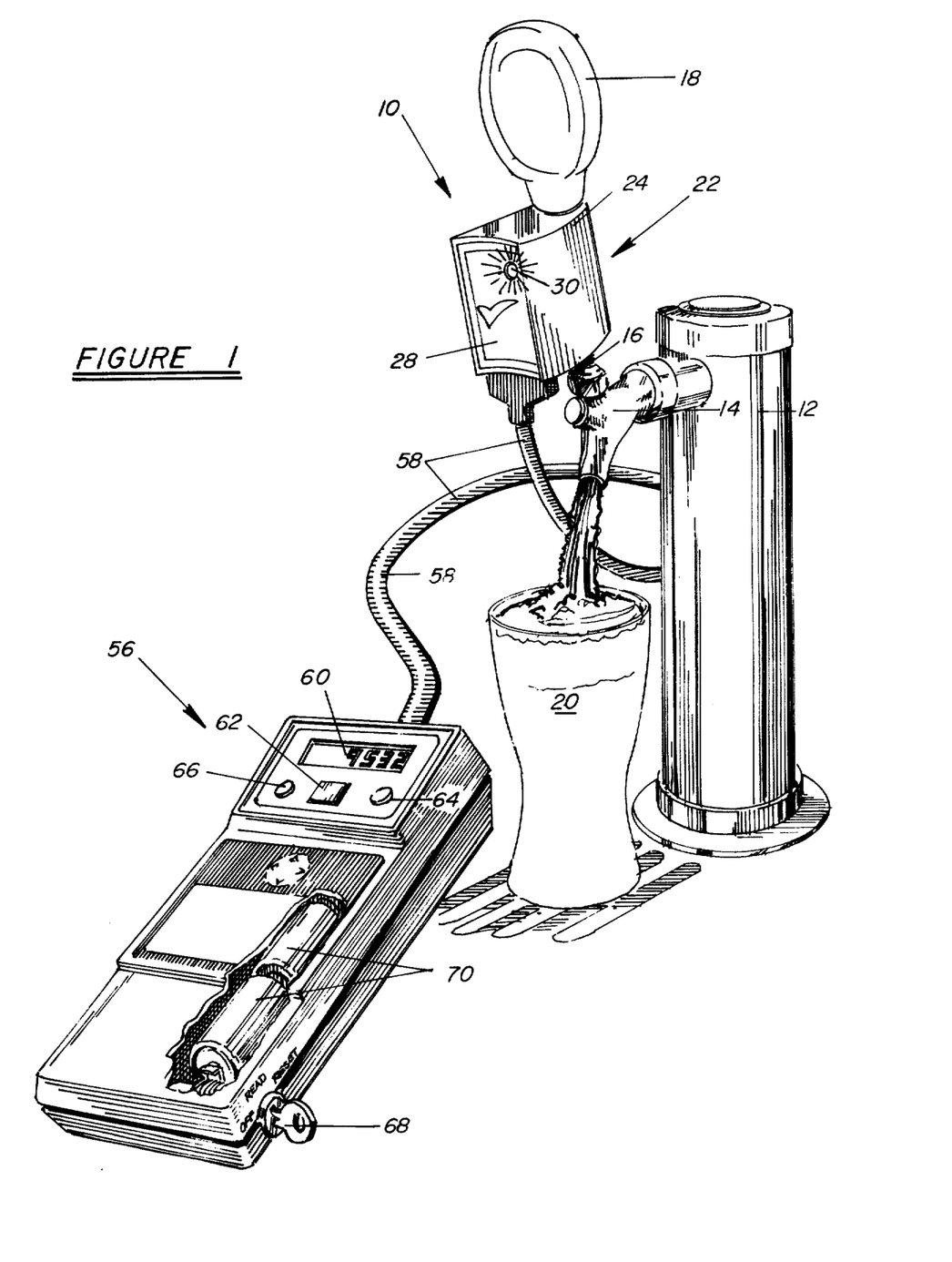
FIG. 1 is a pictorial illustration of the system of the present invention, as specifically adapted for use in the monitoring of draft beer, with a portion cut away.

Reference is initially made to FIG. 1, which illustrates an overall view of the system of the present invention as adapted for use with a draft beer dispenser.

The system, referred to generally as 10, is adapted for use with a draft beer dispenser including a stand 12 connected between a tap 14 and a keg (not shown). Conventional draft beer taps have a shaft 16 which is threaded at the top to receive a handle 18 and which typically includes an advertising message thereon. The tap 14 is adapted to be used to fill a glass or pitcher, for example, the eight ounce Sham Pilsner glass 20 shown in FIG. 1.

Figure 2:
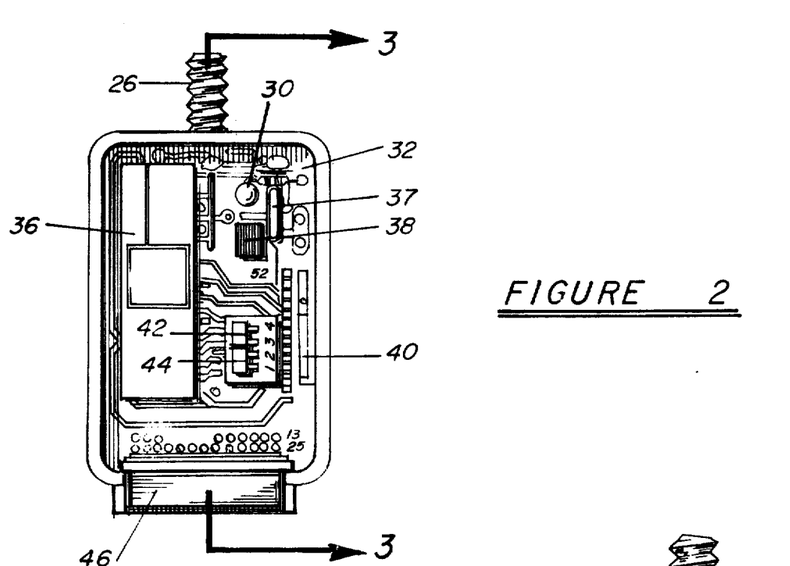
FIG. 2 is a perspective front view of the portion of the apparatus shown in FIG. 1.
Figure 3:
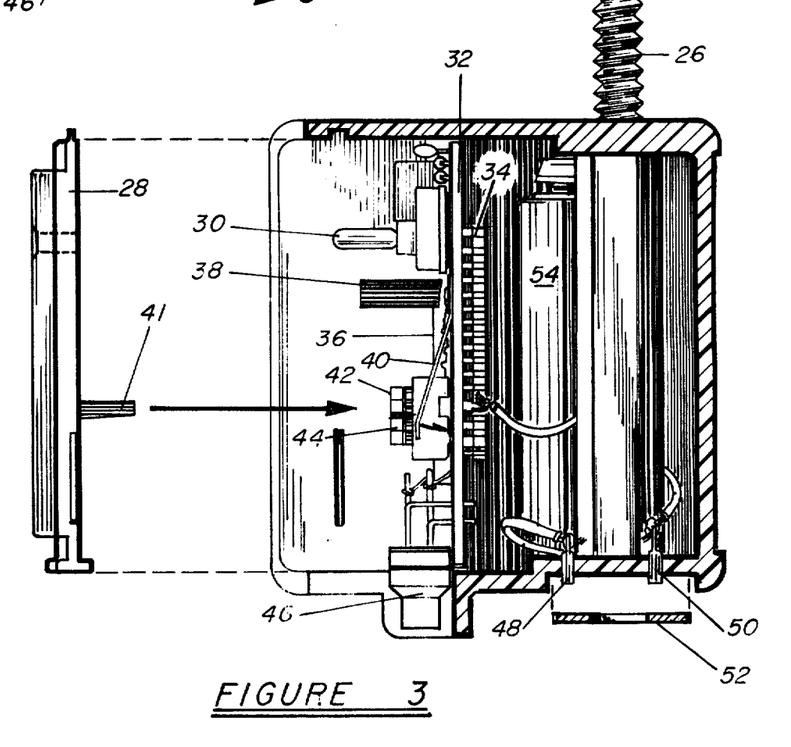
FIG. 3 is a cross section of the apparatus shown in FIG. 2, taken along the lines 3—3.

Reference is now made to FIGS. 1, 2 and 3. The system 10 includes a tap unit 22 comprising a housing 24 having a shaft 26, the shaft having a lower female threaded hole and an upper male threaded portion, so as to mate with the shaft 16 and the handle 18 as shown in FIG. 1. The housing 24 further includes a cover 28 and a light emitting diode 30 extending through a hole in the cover.

Reference is now specifically made to FIGS. 2 and 3 which illustrate details of the internal construction of the tap unit 22. The tap unit 22 is provided with a printed circuit board 32, having conductive strips thereon in a conventional manner to interconnect the various electronic components attached to the board. The circuit includes a random access memory (RAM) 34 attached to the back side of the printed circuit board (FIG. 3) and a microprocessor unit 36 attached to the front side of the printed circuit board 32. A crystal 37 and a mercury switch 38 are likewise coupled to the front of the printed circuit board 32. A normally closed tamper switch 40 is also provided, the tamper switch being maintained in a closed position by a housing arm 41, the switch being opened upon removal of the cover 28. The tap unit 22 further includes a switch panel mounted on the front side of the printed circuit board and having two switches, 42, 44. One of the switches 42 is an on/off switch, and the second switch 44 is referred to as a "clean" switch in FIG. 4.

Figure 4:
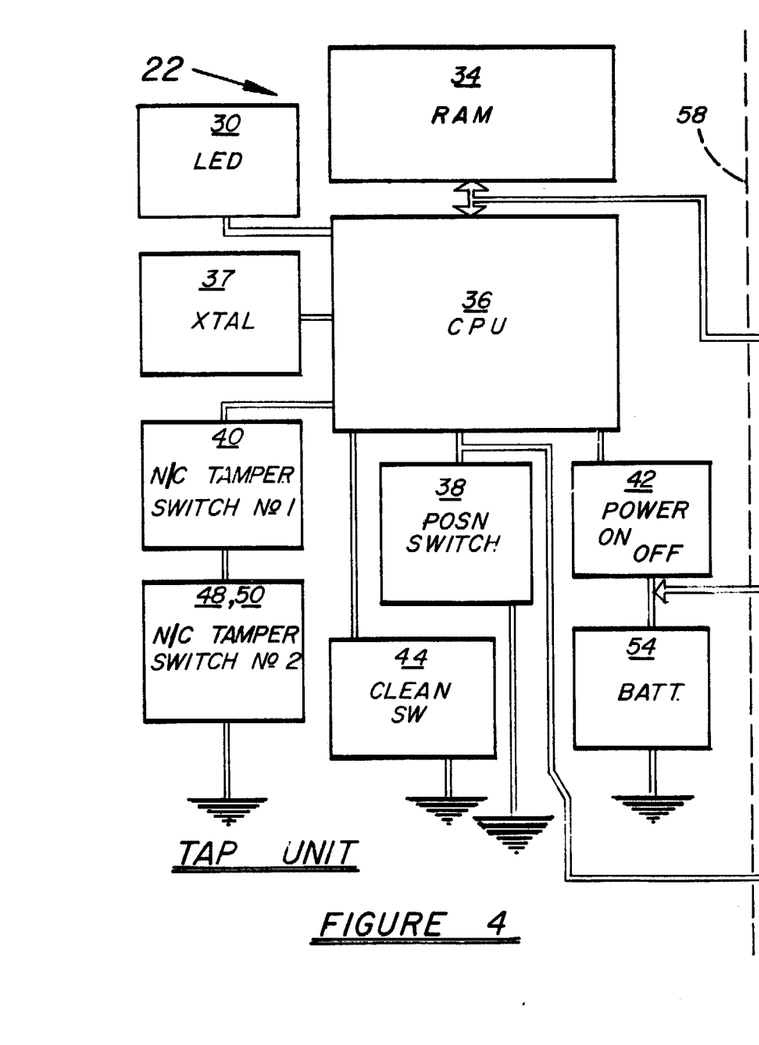
FIG. 4 is a block diagram illustrating the circuitry contained in the apparatus of FIGS. 2 and 3.

The conductive strip on the printed circuit board 32 are designed to describe circuit paths for interconnecting the various components as shown in the block diagram of FIG. 4.

The tap unit 22 further includes a connector 46 mounted at the base of the housing 24 and adapted to be interconnected with a manager's control unit 56 via an electronic cable 58.

As shown in FIG. 3, the tap unit 22 further includes a pair of pins 48, 50 extending through the base of the housing 24 immediately adjacent the point of interconnection with the shaft 16 of the tap 14. A conductive washer 52 surrounds the shaft 16 and interconnects the two pins, forming a normally closed conductive path for a tamper switch as part of the tap unit 22.

The tap unit 22 further includes a direct current battery 54 positioned within the housing 24.

Reference is now made to FIG. 4, where there is shown a block diagram of the electronic circuit contained in the tap unit 22, and in which all of the elements previously described above with reference to FIGS. 1, 2, and 3 are referred to by like reference numerals. The circuit of FIG. 4 includes various inputs and outputs to the circuit of the manager's control unit 56 via the electronic cable 58, and which is depicted as a dotted line between FIGS. 4 and 5.

B. The Manager's Control Unit

Figure 5:
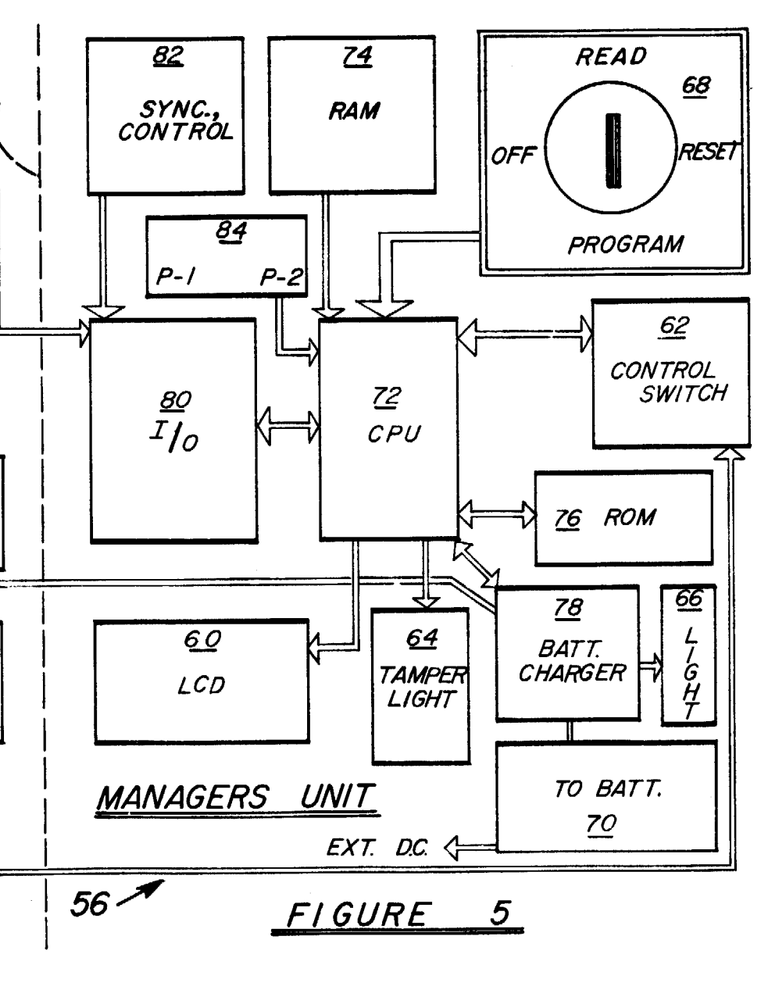
FIG. 5 is a block diagram illustrating the electronic circuitry contained in a portion of the apparatus of FIG. 1 as shown in interrelation with the circuit of FIG. 4.

Reference is now made to FIGS. 1 and 5. The system 10 further includes a manager's control unit 56 having an electronic cable 58 removably coupled to the connector 46 of the tap unit 22. The cable 58 includes plural circuit lines which are described in greater detail with reference to FIGS. 4 and 5.

The manager3 s control unit 56 includes a count display 60, a control switch 62, a "tamper-clean" light 64, and "power cycle" light 66, all mounted on the face of the control unit. The control unit 56 further includes a four position key switch 68, the four positions being nominally identified as OFF, READ, RESET and PROGRAM.

The bottom half of the manager's control unit 56 includes plural storage batteries 70 which are used to charge the battery 54 in the tap unit 22. The manager's control unit 56 further includes an electronic circuit which is contained within the enclosure shown in FIG. 1, and which is illustrated as a block diagram in FIG. 5.

Referring to FIG. 5, the electronic circuit in the manager's control unit 56 includes the elements discussed above with reference to FIG. 1, and which are referred to by like reference numerals. Additionally, the electronic circuit in the manager's control unit 56 includes a microprocessor unit 72 programmed as set forth in the attached appendix. The electronic circuit within the manager's control unit 56 further includes a random access memory (RAM) 74, a read only memory (ROM) 76, a battery charging circuit 78, a conventional input-output device 80, and a synchronization control circuit 82 for operating the input-output device 80, all of the above described elements being connected to and controlled by the microprocessor circuit 72 as shown in FIG. 5.

C. System Operation

Operation of the system 10 will now be described with reference to FIGS. 1 through 5.

Initially, the microprocessor 72 contained in the manager's control unit 56 is programmed in accordance with the program outlined in the attached appendix. This program is conventional neumonic language which is specifically adapted for use with a microprocessor circuit manufactured by RCA Corporation and identified as the RCA CDP1802D. It will be understood by those skilled in the art that the program set forth in the attached appendix may be converted for use with microprocessor circuits manufactured by others. As shown in the appendix, the program includes eleven sections, which are referred to by reference letters A through K, and in which a functional description of each section is set forth.

The microprocessor 36 contained in the tap unit 22 has no programming therein, the functions of that microprocessor being controlled by the random access memory 34 in accordance with the instructions loaded into that RAM from the microprocessor 72 through the circuit lines 58 coupled between those two respective electronic circuits. The totalized readings stored in the microprocessor 36 in the tap unit 22 during operation of the tap 14 are read out of the tap unit 22 into the manager's control unit 56.

When the tap unit 22 is initially installed on to the shaft 16 of the tap 14, the cover 28 is removed and the off/on switch 42 is placed in the "on" position. Likewise, the "clean" switch 44 is placed in the operate position. This clean switch is placed within the tap unit 22 to allow cleaning personnel to operate that switch in order to indicate that a cleaning operation has taken place. This function will be described in greater detail below with respect to the operations of the manager's control unit 56. When the tap unit 22 is screwed on to the shaft 16, the washer 52 is placed over the shaft in order to make conductive contact between the pins 48, 50. As shown in FIG. 4, the conductive path between the pins 48, 50 formed by the washer 52 permits a normally closed condition between the first tamper switch 40 and ground.

When the tap unit 22 has been properly positioned on the shaft 16 and the cover 28 has been returned to the proper position with the housing arm 41 engaging the first tamper switch 40 and with the LED 30 extending through the cover, the electronic cable 58 is coupled to the connector 46 in a manner shown in FIG. 1. Thereafter, the control program is loaded into the RAM 34 via the electronic cable 58 from the manager's unit 56 as hereinafter described.

Initially, the manager operating the control unit 56 makes a selection between two subroutines contained in the program loaded into the microprocessor 72, and which is set forth in the attached appendix. These programs are nominally referred to as "program No. 1" (P-1) and which is shown as Section J of the program in the appendix; and "program No. 2" (P-2) which is shown as Section K in the attached appendix. This selection is made by operating a P-1/P-2 switch 84 inputted through the microprocessor 72 in the manager's unit 56 (Note FIG. 5). The manager then operates the key switch 68 to the PROGRAM position. A 16 oz. beaker is placed underneath the tap 14 and the tap is operated in an uninterrupted manner to fill the beaker. The tap is then shut by rotating the handle 18 backwards in a conventional manner. This action causes the mercury position switch 38 to indicate the closing of the valve 14 to the microprocessor circuit 36. At the same time, the information is relayed to the microprocessor circuit 72 contained in the manager's control unit 56. As noted above, it is preferred that the known volume constitute a 16 oz. beaker, although it will be understood that the system may be calibrated to any container volume by changing the programming of the MPU 72 via the ROM 76.

Thereafter, the microprocessor 72 utilizes Sections G, H and I of the program in order to prepare an ounce calibration for loading into the RAM 34. This calibration serves as a setting in the tap unit 22 representative of a predetermined flow rate of draft beer through the tap 14. This flow rate is determined by calculation of a unit volume for a specific time period, the time period being determined by the crystal 37 coupled to the microprocessor 36 in the tap unit 22. This ounce per unit of time flow rate setting in the tap unit 22 will be maintained until such time as the tap unit 22 is reprogrammed to another flow rate setting, in the manner described above.

The position switch 38 is a conventional mercury switch which provides an electrical indication of movement between two positions, and is utilized in this application to detect movement of the tap 14 between the open and closed positions.

Immediately following the ounce PROGRAM cycle outlined above, a further calibration related to the P-1/P-2 selection is made. Selection of Program No. 1 causes the microprocessor 72 to instruct the RAM 34 to control the microprocessor 36 such that the microprocessor 36 tallies a count for each occurrence of a specified amount of draft beer passing through the tap 14 during any uninterrupted opening of the tap, and to store a total of the counts for each occurrence. This program No. 1 is useful for determining the number of pitchers of draft beer which have been drawn through the tap. 14.

The calibration for program P-1 may be initiated by depressing the CONTROL switch 62 and drawing an amount of beer approximately equal to a pitcher of beer.

Alternatively, if manager has set the switch 84 in the P-2 position, thus calling up the program set forth as Section K, P-2, then this section of the program causes the MPU 72 to instruct the RAM 34 to control the microprocessor 36 to operate the LED 30 for each occurrence of a preselected amount of draft beer passing through the tap at the predetermined flow rate referred to above. This preselected amount may be determined by depressing the CONTROL switch 62 and drawing the desired amount, for example, eight ounces.

After making the ounce programming and selecting between P-1 and P-2 as set forth above, the key switch 68 is then operated to the RESET position and the CONTROL switch 62 is depressed. This loads both of the programs for the ounce calibration and either P-1 or P-2 into the RAM 34 of the tap unit 22 and clears the previous ounce and P-1 or P-2 reading. The key switch 68 is operated to the READ position and the cable 58 is then removed from the tap unit 22, allowing the tap unit to remain free standing with the tap 14. It will be understood that the manager's control unit 56 may be used with a plurality of the tap units 22, and may be required for only a brief period of time during the normal operating cycle in a retail establishment which serves draft beer from numerous taps.

At such time as it is desired to determine the readings collected by the tap unit 22 to recalibrate, or both, the manager's unit 56 is reconnected to the tap unit 22 by coupling of the cable 58 to the connector 46 and operating the system as described next.

With the key switch 68 in the READ position, the manager pushes the control switch 62 on the face of the manager's control unit 56. This control switch operates the microprocessor 72 to permit coupling with the microprocessor 36 in the tap unit 22. At this point, the microprocessor 36 feeds the totalized readings into the microprocessor 72 which are in turn displayed on the liquid crystal display 60 on the face of the manager's unit 56, as controlled by Section C of the program set forth in the attached appendix. At the same time, the batteries 70 contained in the manager's control unit 56 begin an automatic battery charging cycle, which is nominally one minute long, to recharge the battery 54 contained in the tap unit 22. Operation of this battery charging cycle is indicated by the power cycle light 66 on the face of the manager's control unit 56.

For the first 30 seconds following depression of the CONTROL switch 62, the first reading on the display 60 sets forth the total number of ounces which have passed through the tap 14 at the predetermined flow rate as previously set into the RAM 34 in the manner described above. After this first 30 second interval, a second reading sets forth the number of P-1 or P-2 occurrences which have been totalized by the microprocessor 36 since the previous reading.

If either of the tamper switches 48, 50 or 40 contained in the tap unit 22 have been opened during the interval between readings, the tamper light 64 operates continuously during the interconnection between the manager's unit 56 and the tap unit 22. However, in the event that the "clean" switch 44 has been operated by cleaning personnel in the interim, the tamper light 64 will flash intermittently. This function is controlled by section E of the program contained in the microprocessor 72. As a result, the manager is able to determine if the tap unit has been tampered with since the last reading, and if such tampering was a result of a cleaning operation by authorized personnel.

Thereafter, the manager may operate the key switch 68 to the PROGRAM position, and recalibrate the tap unit 22 for a new predetermined flow rate setting, and a selection between either P-1 or P-2, all as has been described above.

APPENDIX

[Assembly code listing follows, divided into sections A (Set Up), B (Key Scan), and additional sections — text illegible at this resolution]

This page is too faded and low-resolution to reliably transcribe the assembly listing. The only clearly legible annotations are the labeled brackets on the right side:

C — Read

D — Interrupt Control For Direct Memory Access

```
009E 42;     0132  LDA R2
009F AC;     0133  PLO PC
00A0 02;     0134  LDN R2
00A1 BC;     0135  PHI PC    ..PC=BINS
00A2 F805;   0136  LDI #05
00A4 AB;     0137  PLO RB
00A5 2B;     0138  PHI RB    ..BYTE COUNT
00A6 F800;   0139  LDI A.0(PAD)
00A8 A2;     0140  PLO R2
00A9 F811;   0141  LDI A.0(BCD+4)
00AB AA;     0142  PLO RA
00AC 92;     0143  GHI R2
00AD BA;     0144  PHI RA
00AE E2;     0145  SEX R2
00AF ;       0146  ;
00AF F800;   0147  CLR:LDI #00
00B1 5A;     0148  STR RA
00B2 2A;     0149  DEC RA
00B3 2B;     0150  DEC RB
00B4 8B;     0151  GLO RB
00B5 3AAF;   0152  BNZ CLR
00B7 1A;     0153  INC RA
00B8 9B;     0154  GHI RB
00B9 AB;     0155  PLO RB
00BA ;       0156  ;
00BA 8C;     0157  LOOP1:GLO PC
00BB FE;     0158  SHL
00BC AC;     0159  PLO PC
00BD 9C;     0160  GHI PC
00BE 7E;     0161  SHLC
00BF BC;     0162  PHI PC
00C0 0A;     0163  LDN RA
00C1 7C00;   0164  ADCI #00
00C3 5A;     0165  STR RA
00C4 8D;     0166  GLO PD
00C5 32DB;   0167  BZ PEND
00C7 ;       0168  ;
00C7 0A;     0169  NEXT:LDN RA
00C8 7E;     0170  SHLC
00C9 5A;     0171  STR RA
00CA FF0A;   0172  SMI #0A
00CC 3BCF;   0173  BNF *+#03
00CE 5A;     0174  STR RA
00CF 1A;     0175  INC RA
00D0 2B;     0176  DEC RB
00D1 8B;     0177  GLO RB
00D2 3AC7;   0178  BNZ NEXT
00D4 2D;     0179  DEC RD
00D5 8A;     0180  GLO RA
00D6 FCFB;   0181  ADI #FB
00D8 AA;     0182  PLO RA
00D9 30BA;   0183  BR LOOP1-#02
00DB ;       0184  ;
00DB F80E;   0185  PEND:LDI A.0(BCD+1)
00DD A2;     0186  PLO R2
00DE F0;     0187  LDX
00DF FE;     0188  SHL
00E0 FE;     0189  SHL
00E1 FE;     0190  SHL
00E2 FE;     0191  SHL
00E3 22;     0192  DEC R2
00E4 F1;     0193  OR
00E5 52;     0194  STR R2
00E6 61;     0195  OUT 1
00E7 60;     0196  IRX
00E8 60;     0197  IRX
00E9 F0;     0198  LDX
00EA FE;     0199  SHL
00EB FE;     0200  SHL
00EC FE;     0201  SHL
00ED FE;     0202  SHL
00EE 22;     0203  DEC R2
00EF F1;     0204  OR
```

E

Binary to BCD
Conversion & Battery
Charge

```
00F0  52;            0205      STR R2
00F1  62;            0206      OUT 2
00F2  60;            0207      IRX
00F3  63;            0208      OUT 3
00F4  F80B;          0209      LDI A.0(TAMP)
00F6  A2;            0210      PLO R2
00F7  F80E;          0211      LDI #0E
00F9  A8;            0212      PLO R8
00FA  72;            0213      LDXA
00FB  C20101;        0214      LBZ FIN0
00FE  F80F;          0215      LDI #0F
0100  A8;            0216      PLO R8
0101  ;              0217  ;
0101  E9;            0218  FIN0:SEX R9
0102  F81E;          0219      LDI #1E
0104  A5;            0220      PLO R5
0105  ;              0221  ;
0105  88;            0222  FIN1:GLO R8
0106  59;            0223      STR R9
0107  67;            0224      OUT 7       ..CHARGER ON
0108  29;            0225      DEC R9
0109  ;              0226  ;
0109  F877;          0227  FIN2:LDI #77
010B  A6;            0228      PLO R6
010C  F807;          0229      LDI #07
010E  B6;            0230      PHI R6
010F  ;              0231  ;
010F  26;            0232  FIN3:DEC R6
0110  96;            0233      GHI R6
0111  3A0F;          0234      BNZ FIN3
0113  86;            0235      GLO R6
0114  3A0F;          0236      BNZ FIN3
0116  E2;            0237      SEX R2
0117  F0;            0238      LDX
0118  E9;            0239      SEX R9
0119  3220;          0240      BZ FIN4
011B  F80E;          0241      LDI #0E
011D  59;            0242      STR R9
011E  67;            0243      OUT 7
011F  29;            0244      DEC R9
0120  ;              0245  ;
0120  25;            0246  FIN4:DEC R5
0121  85;            0247      GLO R5
0122  C2009A;        0248      LBZ EXFRCD
0125  76;            0249      SHRC
0126  3309;          0250      BDF FIN2
0128  3005;          0251      BR FIN1
012A  ;              0252  ;
012A  8E;            0253  MGMT:GLO RE
012B  3A33;          0254      BNZ MG1
012D  F801;          0255      LDI #01
012F  AE;            0256      PLO RE
0130  C0007B;        0257      LBR READ
0133  ;              0258  ;
0133  8F;            0259  MG1:GLO RF
0134  3A7B;          0260      BNZ LCAL
0136  9F;            0261      GHI RF
0137  3A7B;          0262      BNZ LCAL
0139  3D48;          0263      BNZ LCHN
013B  9E;            0264      GHI RE
013C  3A48;          0265      BNZ LCHN
013E  F801;          0266      LDI #01
0140  BE;            0267      PHI RE
0141  F84B;          0268      LDI A.0(MG2)
0143  A1;            0269      PLO R1
0144  F801;          0270      LDI A.1(MG2)
0146  B1;            0271      PHI R1
0147  D1;            0272      SEP R1
0148  ;              0273  ;
0148  C00024;        0274  LCHN:LBR SCAN
014B  ;              0275  ;
014B  E2;            0276  MG2:SEX R2
014C  F80C;          0277      LDI A.0(TAMP+1)
```

```
014E  A2;           0278   PLO R2
014F  F804;         0279   LDI A.1(TAMP+1)
0151  B2;           0280   PHI R2
0152  F800;         0281   LDI #00
0154  73;           0282   STXD
0155  73;           0283   STXD    ..TAMP=0
0156  9E;           0284   GHI RE
0157  3A5F;         0285   BNZ LOAD
0159  F800;         0286   LDI #00
015B  73;           0287   STXD
015C  73;           0288   STXD    ..NOUNC=0
015D  73;           0289   STXD
015E  52;           0290   STR R2   ..NGLAC=0
015F  ;             0291   ;
015F  E9;           0292   LOAD:SEX R9
0160  F808;         0293   LDI #08
0162  59;           0294   STR R9
0163  67;           0295   OUT 7    ..RESET
0164  29;           0296   DEC R9
0165  F800;         0297   LDI #00
0167  59;           0298   STR R9
0168  67;           0299   OUT 7    ..LOAD
0169  29;           0300   DEC R9
016A  F800;         0301   LDI A.0(PROG1)
016C  A2;           0302   PLO R2
016D  F803;         0303   LDI A.1(PROG1)
016F  B2;           0304   PHI R2    ..R2=PROG ADDR
0170  E2;           0305   SEX R2
0171  F800;         0306   LDI #00
0173  B5;           0307   PHI R5
0174  A5;           0308   PLO R5    ..R5=SEQ FLG
0175  F807;         0309   LDI #07
0177  A6;           0310   PLO R6    ..R6=BYTE COUNT
0178  C001C0;       0311   LBR IN1
017B  ;             0312   ;
017B  F800;         0313   LCAL:LDI #00
017D  AF;           0314   PLO RF
017E  BF;           0315   PHI RF
017F  BE;           0316   PHI RE
0180  F804;         0317   LDI #04
0182  AC;           0318   PLO RC
0183  ;             0319   ;
0183  9A;           0320   LC1:GHI RA
0184  F6;           0321   SHR
0185  BA;           0322   PHI RA
0186  8A;           0323   GLO RA
0187  76;           0324   SHRC
0188  AA;           0325   PLO RA
0189  2C;           0326   DEC RC
018A  8C;           0327   GLO RC
018B  3A83;         0328   BNZ LC1
018D  F806;         0329   LDI A.0(OPACT+1)
018F  A9;           0330   PLO R9
0190  9A;           0331   GHI RA
0191  73;           0332   STXD
0192  8A;           0333   GLO RA
0193  73;           0334   STXD
0194  9B;           0335   GHI RB
0195  73;           0336   STXD
0196  8B;           0337   GLO RB
0197  73;           0338   STXD
0198  F25F;         0339   LDI A.0(LOAD)
019A  A1;           0340   PLO R1
019B  F801;         0341   LDI A.1(LOAD)
019D  B1;           0342   PHI R1
019E  F000;         0343   LDI A.0(END)
01A0  A9;           0344   PLO R9
01A1  D1;           0345   SEP R1
01A2  ;             0346   ;
01A2  F8AF;         0347   LD1:LDI A.0(INTOUT)
01A4  A1;           0348   PLO R1
01A5  F801;         0349   LDI A.1(INTOUT)
01A7  B1;           0350   PHI R1   ..R1=INT ADDR
```

G

Load Control

```
01A8 66:        0351    OUT 6    ..OUT INTR
01A9 65:        0352    OUT 5    ..REQ DMA
01AA 22:        0353    DEC R2
01AB E0:        0354    SEX R0
01AC 70:        0355    RET
01AD 00:        0356    .00
01AE 00:        0357    IDL      ..WAIT FOR INTR
01AF :          0358    :
01AF E9:        0359    INTOUT:SEX R9
01B0 F801:      0360    LDI #01
01B2 59:        0361    STR R9
01B3 67:        0362    OUT 7
01B4 29:        0363    DEC R9
01B5 F800:      0364    LDI #00
01B7 59:        0365    STR R9
01B8 67:        0366    OUT 7    ..RESET INTR
01B9 29:        0367    DEC R9
01BA E2:        0368    SEX R2
01BB 26:        0369    DEC R6
01BC 86:        0370    GLO R6
01BD C201C7:    0371    LBZ TEND
01C0 :          0372    :
01C0 F8A2:      0373    INT:LDI H.0(LDI)
01C2 A0:        0374    PLO R0
01C3 F801:      0375    LDI H.1(LDI)
01C5 B0:        0376    PHI R0
01C6 D0:        0377    SEP R0
01C7 :          0378    :
01C7 85:        0379    TEND:GLO R5
01C8 32D6:      0380    BZ TE1
01CA 95:        0381    GHI R5
01CB 32E5:      0382    BZ TE2
01CD E9:        0383    SEX R9
01CE F808:      0384    LDI #08
01D0 59:        0385    STR R9
01D1 67:        0386    OUT 7    ..RESET
01D2 29:        0387    DEC R9
01D3 C0002E:    0388    LBR FINC
01D6 :          0389    :
01D6 F801:      0390    TE1:LDI #01
01D8 A5:        0391    PLO R5
01D9 F80A:      0392    LDI #0A
01DB A6:        0393    PLO R6
01DC F803:      0394    LDI H.0(GFACT)
01DE A2:        0395    PLO R2
01DF F804:      0396    LDI H.1(GFACT)
01E1 B2:        0397    PHI R2
01E2 C001C0:    0398    LBR INT
01E5 :          0399    :
01E5 F801:      0400    TE2:LDI #01
01E7 B5:        0401    PHI R5
01E8 F86F:      0402    LDI #6F
01EA A6:        0403    PLO R6
01EB F811:      0404    LDI H.0(PROG1+17)
01ED 7A:        0405    REQ
01EE 3FF2:      0406    BN4 *+4
01F0 F891:      0407    LDI H.0(PROG2+17)
01F2 7B:        0408    SEQ
01F3 A2:        0409    PLO R2
01F4 F803:      0410    LDI H.1(PROG2+17)
01F6 B2:        0411    PHI R2
01F7 C001C0:    0412    LBR INT
01FA :          0413    :
01FA :          0414    ORG #0200
0200 9F:        0415    CAL:GHI RF
0201 3A20:      0416    BNZ CAL1    ..SECOND CAL
0203 :          0417    :
0203 8F:        0418    CAL1:GLO RF
0204 3A1B:      0419    BNZ CAL1
0206 1F:        0420    INC RF
```

Program Load

```
0207 F800:              0421    LDI #00
0209 AA:                0422    PLO RA
020A BA:                0423    PHI RA
020B :                  0424  :
020B 3525:              0425  CAL2:B2 CAL5    ..PUSH SW
020D 3C18:              0426    BN1 CAL4      ..SW OPEN
020F F80C:              0427    LDI #0C       ..SW CLOSED
0211 A4:                0428    PLO R4
0212 :                  0429  :
0212 24:                0430  CAL3:DEC R4
0213 84:                0431    GLO R4
0214 3A12:              0432    BNZ CAL3      ..TIME DELAY
0216 1A:                0433    INC RA
0217 9A:                0434    GHI RA        ..DUMMY
0218 :                  0435  :
0218 C00024:            0436  CAL4:LBR CAN
021B :                  0437  :
021B 94:                0438  CAL11:GHI R4
021C 94:                0439    GHI R4
021D 94:                0440    GHI R4        ..TIME DELAY
021E 300B:              0441    BR CAL2
0220 :                  0442  :
0220 F803:              0443  CAL61:LDI #03
0222 A4:                0444    PLO R4
0223 :                  0445  :
0223 24:                0446  CAL62:DEC R4
0224 84:                0447    GLO R4
0225 3A23:              0448    BNZ CAL62
0227 3030:              0449    BR CAL6
0229 :                  0450  :
0229 F800:              0451  CAL5:LDI #00
022B AB:                0452    PLO RB
022C BB:                0453    PHI RB
022D F801:              0454    LDI #01
022F BF:                0455    PHI RF
0230 :                  0456  :
0230 3C3C:              0457  CAL6:BN1 CAL9
0232 F80A:              0458    LDI #0A
0234 A4:                0459    PLO R4
0235 :                  0460  :
0235 24:                0461  CAL7:DEC R4
0236 84:                0462    GLO R4
0237 3A35:              0463    BNZ CAL7      ..TIME DELAY
0239 1B:                0464    INC RB
023A 94:                0465    GHI R4
023B 94:                0466    GHI R4
023C :                  0467  :
023C C00024:            0468  CAL8:LBR CAN
023F :                  0469  :
023F :                  0470    ORG #0300
0300 F811A2F800B2D8:    0471  PROG1:.#F811A2F800B2D8F2
0307 F2:                0471
0308 0022000000000:     0472    .#0022000000000000
030F 00:                0472
0310 0090BDF1F807A1:    0473    .#0090BDF1F807A1E1
0317 E1:                0473
0318 72AE72BE72AF72:    0474    .#72AE72BE72AF72BF
031F BF:                0474
0320 F800ADAD3E703C:    0475    .#F800ADAD3E703C74
0327 74:                0475
0328 2F9F3A478F3A49:    0476    .#2F9F3A478F3A49F8
032F F8:                0476
0330 09A172AF72BFF8:    0477    .#09A172AF72BFF80D
0337 0D:                0477
0338 A1F801F45160F8:    0478    .#A1F801F45160F800
033F 00:                0478
0340 745151305384A4:    0479    .#745151305384A4A4
0347 A4:                0479
0348 A4A4F804A4A424:    0480    .#A4A4F804A4A42454
```

I — Program

J — Program P-1

```
034F  84;                0480
0350  3A4EA4A1)5A201D;   0481    ,=3A4EA4A1)3A001D4D
0357  4D;                0481
0358  3A452E9E3A482E;    0482    ,=3A452E9E3A482E3A
035F  3A;                0482
0360  4AF801EDBDEDF8;    0483    ,=4AF801EDBDEDF80B
0367  0B;                0483
0368  3038F80FA15130;    0484    ,=3038F80FA1513020
036F  20;                0484
0370  F81030ECBDF807;    0485    ,=F81030ECBDF807A1
0377  A1;                0485
0378  72AE72BE3D6A30;    0486    ,=72AE72BE3D6A3020
037F  20;                0486
0380  ;                  0487    ;
0380  ;                  0488            ORG  =0380
0380  F811A8F800B8D8;    0489    PROG2:,=F811A8F800B8D8F2
0387  F2;                0489
0388  0022000000000;     0490    ,=002200000000000
038F  00;                0490
0390  0090BDB1F807A1;    0491    ,=0090BDB1F807A1E1
0397  E1;                0491
0398  72AE72BE72AF72;    0492    ,=72AE72BE72AF72BF
039F  BF;                0492
03A0  F800AD3E763C7A;    0493    ,=F800AD3E763C7A2F
03A7  2F;                0493
03A8  9F3A658F3A67F8;    0494    ,=9F3A658F3A67F809
03AF  09;                0494
03B0  A172AF72BFF80D;    0495    ,=A172AF72BFF80DA1
03B7  A1;                0495
03B8  F801F45160F800;    0496    ,=F801F45160F80074
03BF  74;                0496
03C0  518D3A201D9D3A;    0497    ,=518D3A201D9D3A5E
03C7  5E;                0497
03C8  2E9E3A618E3A63;    0498    ,=2E9E3A618E3A63F8
03CF  F8;                0498
03D0  07A172AE72BEF8;    0499    ,=07A172AE72BEF801
03D7  01;                0499
03D8  BD7AF80B3037A4;    0500    ,=BD7AF80B3037A4A4
03DF  A4;                0500
03E0  A4A4A4A4A4A4A4;    0501    ,=A4A4A4A4A4A4A4F8
03E7  F8;                0501
03E8  04A42484 3A6A30;   0502    ,=04A42484 3A6A3041
03EF  41;                0502
03F0  F80FA15130 20F8;   0503    ,=F80FA15130 20F810
03F7  10;                0503
03F8  3072 7FBD3D7030;   0504    ,=3072 7FBD3D702020
03FF  20;                0504
0400  ;                  0505    ;
0400  ;                  0506            ORG  =0400
0400  000000;            0507    IPAD: ,=00,00,00
0403  0000;              0508    GFACT:,=00,00
0405  0000;              0509    UFFCT:,=00,00
0407  0000;              0510    NGLA: ,=00,00
0409  0000;              0511    HOUNC:,=00,00
040B  0000;              0512    TAMP: ,=00,00
040D  0000000000;        0513    BCD:  ,=00,00,00,00,00
0412  ;                  0514    ;
0412  ;                  0515    END
```

I claim:

1. An apparatus for measuring and totalizing an amount of a fluid dispensed through an outlet from a reservoir of said fluid, said outlet of the type controlling the flow of said fluid from said reservoir by movement between open and closed positions, said apparatus comprising:

position detecting means coupled at said outlet for detecting said movement between said open and closed positions and providing an electrical output responsive thereto:

totalizing means receiving said output from said position detecting means and totalizing an amount of said fluid passing through said outlet based on a setting in said totalizing means for a predetermined flow rate;

means for changing said totalizing means to a setting representative of another predetermined flow rate;

a count display;

means for coupling said count display to an output of said totalizing means whereby a count representative of said amount of said fluid may be displayed;

K

Program P-2 a key operated switch;

circuit means coupling said key switch to said totalizing means;

means coupled through said key switch to said totalizing means for providing a signal to said totalizing means responsive to operation of said key switch to clear said amount therefrom;

indicating means coupled to a first output of said totalizing means; and means for energizing said indicating means for each occurrence of a preselected amount of said fluid passing through said outlet at said predetermined flow rate.

2. The apparatus recited in claim 1 further comprising:

means for consecutively counting each occurrence of a specified amount of said fluid at said predetermined flow rate passing through said outlet during any uninterrupted opening of said outlet and storing a total of all of said occurrences; and means for coupling said count display to said totalizing means, such that a count representative of all of said occurrences can be displayed.

3. The apparatus recited in claim 1 wherein said outlet comprises a valve actuated by a handle, said apparatus further comprising a housing carried by said handle and including said position detecting means therein.

4. The apparatus recited in claim 3 further comprising:

a tamper indicator;

tamper detection means carried by said housing for providing an output responsive to an external stimulus; and means coupling said tamper indicator to said tamper detection means, whereby attempts to tamper with said apparatus may be indicated.

5. The apparatus recited to claim 4 wherein said housing includes a cover, said tamper detection means comprising means for detecting removal of said cover.

6. The apparatus recited in claim 4 wherein said handle comprises a threaded shaft, said housing including a corresponding threaded hole such that said housing may be threaded on to said shaft, said tamper detecting means comprising means for detecting a predetermined amount of rotation of said housing about said shaft.

7. The apparatus recited in claim 6 wherein said housing includes a cover, said tamper detection means further including means coupled with said rotation detection means for detecting removal of said cover, whereby an input is provided to said totalizing means responsive to either rotation of said housing about said shaft or removal of said cover.

8. The apparatus recited in claim 6 wherein said rotation detection means comprises:

a conductive washer carried by said shaft;

a pair of electrical contacts extending through said housing and bridged by said washer when said housing is in place on said shaft; and wherein movement of said housing about said shaft causes interruption of the bridging of said contacts by said washer.

9. The apparatus recited in claim 3 further comprising a control unit independent of said housing, said control unit including plural electrical circuit lines removably connectable with said housing.

10. The apparatus recited in claim 9 wherein said means for changing is carried by said control unit.

11. The apparatus recited in claim 10 further comprising:

at least one storage battery carried by said housing for energizing portions of said apparatus within said housing;

at least one storage battery carried by said control unit; and means coupling said control unit storage battery across said housing storage battery when said plural circuit lines are connected between said housing and said control unit.

12. The apparatus recited in claim 10 further comprising:

a tamper indicator carried by said control unit;

tamper detection means carried by said housing for providing an output responsive to preselected external stimulus; and wherein said plural circuit lines include means for coupling said tamper detection means to said tamper indicator when said control unit is coupled to said housing.

13. The apparatus recited in claim 10 wherein said means for changing comprises:

said totalizing means including programmed data storage means carried by said control unit;

a programming switch carried by said control unit; and wherein said circuit lines include means coupling said data storage means to said position detection means responsive to operation of said switch, whereby said storage means records said setting representative of said predetermined flow rate in relation to the amount of time required to fill an enclosure of a known volume.

14. The apparatus recited in claim 13 wherein said key switch is carried by said control unit, said circuit means coupling said key switch to said totalizing means including said plural circuit lines.

15. The apparatus recited in claim 14 wherein said programming switch and said key switch comprises a single key operated switch.

16. The apparatus recited in claim 13 further comprising control switching means selectively coupling said data storage means with said housing through said circuit lines, whereby said setting is recorded in said totalizing means.

17. The apparatus recited in claim 16 wherein said control switching means is carried by said control unit.

18. The apparatus recited in claim 1 further comprising:

said totalizing means including first means for energizing said indicating means for each occurrence of a preselected amount of said fluid passing through said outlet at said predetermined flow rate;

said totalizing means further including second means for consecutively counting each occurrence of a specified amount of said fluid at said predetermined flow rate passing through said outlet during any uninterrupted opening of said outlet and storing a total of all of said occurrences; and means for coupling said count display to said totalizing means, such that a count representative of all of said occurrences can be displayed.

19. The apparatus recited in claim 18 further comprising:

a housing carried by said valve, said housing including said position detecting means and a portion of said totalizing means;

a control unit independent of said housing, said control unit including plural electrical circuit lines removably connectable with said totalizing means in said housing, said plural circuit lines comprising said means coupling said count display to said totalizing means; and wherein said means for changing said predetermined flow rate setting and said count display are carried by said control unit.

20. The apparatus recited in claim 19 further comprising a function switch carried by said control unit and coupled to said totalizing means for operationally selecting between said first and second means.

21. The apparatus recited in claim 1 further comprising:

said totalizing means including data storage means;
a switch; and
means coupling said data storage means to said position detecting means responsive to operation of said switch, whereby said data storage means records said predetermined flow rate in relation to the amount of time required to fill an enclosure of a known volume.

22. Apparatus for measuring an amount of the fluid passing through an outlet from a reservoir of said fluid, said apparatus comprising:

first means for providing an output responsive to the flow of said fluid through said outlet;
totalizing means receiving said output from said first means and totalizing an amount of said fluid passing through said outlet based on a setting in said totalizing means for a predetermined flow rate;
a count display;
said totalizing means including means for consecutively counting each occurrence of a specified amount of said fluid at said predetermined flow rate passing through said outlet during any uninterrupted opening of said outlet and storing a total of all of said occurrences;
means for coupling said count display to said totalizing means, such that a count representative of all of said occurrences can be displayed;
said totalizing means including programmed data storage means;
means coupling said data storage means to said first means, whereby said data storage means records said predetermined flow rate in relation to the amount of time required to fill an enclosure of a known volume;
said totalizing means including means for computing said amount of fluid as the time said detecting means provides an output responsive to fluid flow through said outlet at said predetermined flow rate;
indicating means coupled to a first output of said totalizing means; and
said totalizing means further including means for energizing said indicating means for each occurrence of a preselected amount of said fluid passing through said outlet at said predetermined flow rate.

23. The apparatus recited in claim 22 wherein said totalizing means further includes means with said count display for providing a count representative of a total amount of said fluid passing through said outlet.

24. A beverage accountability system for measuring and totalizing an amount of a beverage, such as draft beer or the like, dispensed through a tap from a container for said beverage, in which the flow of said beverage to said tap is controlled by movement of said tap between open and closed positions, said system comprising:

a housing carried by said tap and movable therewith between said open and closed positions;
position detecting means carried by said housing for detecting said movement of said tap between said open and closed positions and providing an output responsive thereto;
means receiving said output from said position detecting means and totalizing the total amount of said beverage passing through said tap during each and all times when said tap is in said open position;
a control unit separate from said tap and said housing, said control unit having plural electrical circuit lines connectable with said totalizing means;
a count display carried by said control unit;
said totalizing means including first means for consecutively counting each occurrence of a specified amount of said fluid at a predetermined flow rate passing through said outlet during any uninterrupted opening of said outlet and storing a total of all of said occurrences;
means for coupling said count display to said totalizing means, such that a count representative of said total amount and all of said occurrences can be displayed;
indicating means carried by said housing;
said totalizing means coupled to said indicating means to energize said indicating means for each occurrence of a preselected amount of said fluid passing through said outlet at said predetermined flow rate;
said totalizing means including programmed data storage means carried by said control unit;
a switch carried by said control unit;
means coupling said data storage means to said position detection means responsive to operation of said switch, whereby said data storage means records said predetermined flow rate in relation to the amount of time required to fill an enclosure of a known volume, during an uninterrupted opening of said tap to fill said enclosure; and
said housing further including a portion of said totalizing means, said circuit lines including means coupling said data storage means to said totalizing means in said housing, whereby said total amount and said number of occurrences are computed by said portion of said totalizing means in said housing.

25. The apparatus recited in claim 24 wherein said tap includes a threaded shaft, said housing including a corresponding threaded hole such that said housing may be threaded on to said shaft.

26. The apparatus recited in claim 25 further comprising:

a tamper indicator;
tamper detection means carried by said housing for providing an output responsive to an external stimulus; and
means coupling said tamper indicator to said tamper detection means, whereby attempts to tamper with said apparatus may be indicated.

27. The apparatus recited in claim 26 wherein said tamper detection means comprises:

a conductive washer carried by said shaft;
a pair of electrical contacts extending through said housing and bridged by said washer when said housing is in place on said shaft; and wherein movement of said housing about said shaft causes interruption of the bridging of said contacts by said washer.

28. A beverage accountability system for measuring and totalizing an amount of a beverage, such as draft beer or the like, dispensed through a tap from a container for said beverage, in which the flow of said beverage through said tap is controlled by movement of said tap between open and closed positions, said system comprising:
   a housing carried by said tap and movable therewith between said open and closed positions;
   position detecting means carried by said housing for detecting said movement of said tap between said open and closed positions and providing an output responsive thereto;
   means in said housing for receiving said output from said position detecting means and totalizing the total amount of said beverage passing through said tap during each or all times when said tap is in said open position;
   indicating means coupled with a first output of said totalizing means and carried by said housing; and
   said totalizing means including means for energizing said indicating means for each occurrence of a preselected amount of said fluid passing through said outlet at said predetermined flow rate.

29. The apparatus recited in claim 28 further comprising:
   a control unit independent of said housing, said control unit including plural circuit lines removably connectable with said totalizing means in said housing;
   said totalizing means including data storage means carried by said control unit;
   a switch carried by said control unit; and wherein
   said circuit lines includes means coupling said data storage means to said position detecting means responsive to operation of such switch, whereby said data storage means records said predetermined flow rate in relation to the amount of time required to fill an enclosure of a known volume.

* * * * *